A. B. WEIL & H. F. STUHR.
SAFETY APPLIANCE FOR MOTOR VEHICLES.
APPLICATION FILED JAN. 7, 1913.
1,113,524.
Patented Oct. 13, 1914.
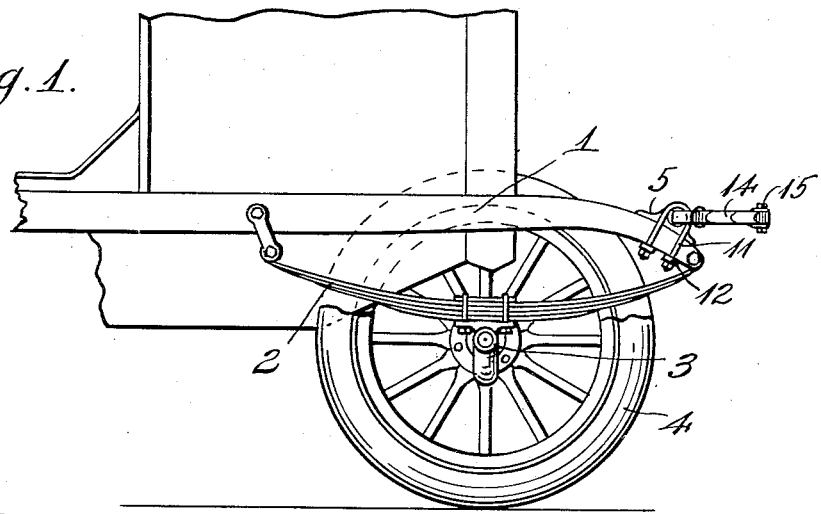
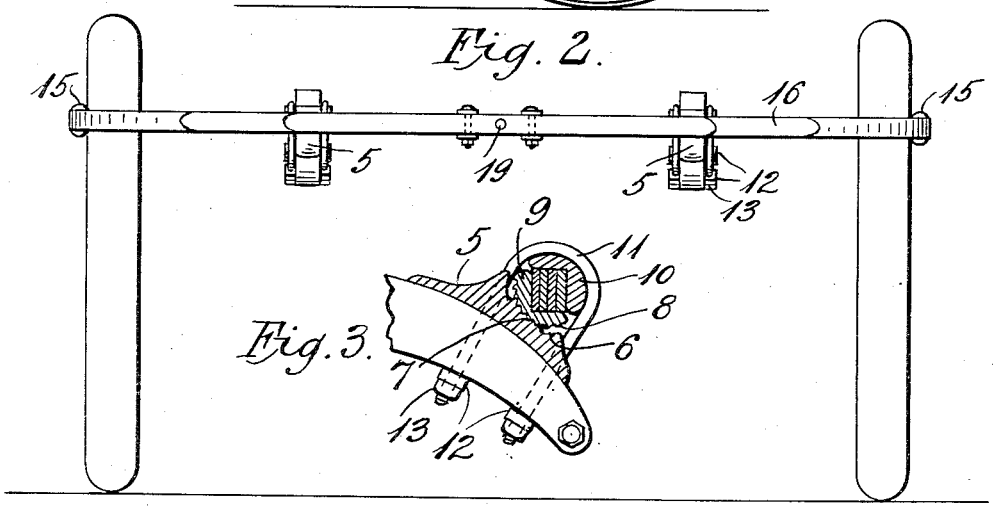
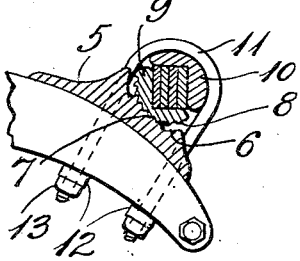
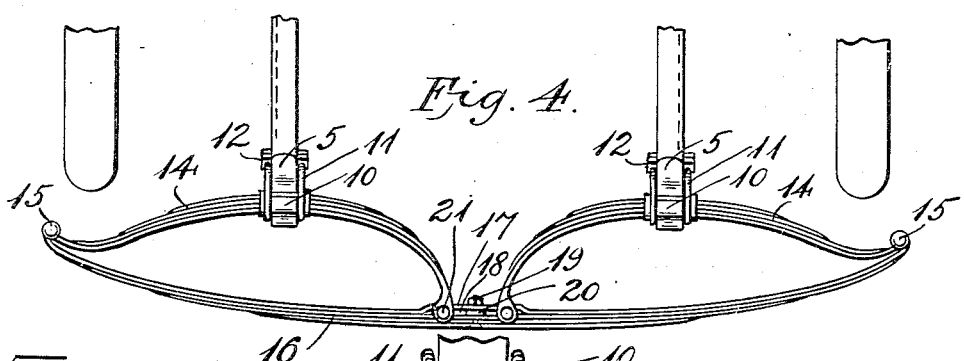
Witnesses:
A. L. Lord.
E. H. Tresch.
Inventors.
Arthur B. Weil and
Herman F. Stuhr
by B. W. Brockett
Atty.

UNITED STATES PATENT OFFICE.

ARTHUR B. WEIL AND HERMAN F. STUHR, OF CLEVELAND, OHIO.

SAFETY APPLIANCE FOR MOTOR-VEHICLES.

1,113,524.  Specification of Letters Patent.  Patented Oct. 13, 1914.

Application filed January 7, 1913. Serial No. 740,664.

*To all whom it may concern:*

Be it known that we, ARTHUR B. WEIL and HERMAN F. STUHR, citizens of the United States, residing at Cleveland, in the county of Cuyahoga and State of Ohio, have invented certain new and useful Improvements in Safety Appliances for Motor-Vehicles, of which the following is a specification.

This invention relates generally to safety appliances for motor vehicles and particularly to bumpers or fenders used upon the front of the car.

More specifically the invention relates to a bumper or fender comprising a long spring composed of a plurality of leaves extending from one side of the machine to the other and supported upon shorter semi-elliptic springs each secured at one end to one end of the long spring and having its other end secured preferably near the center of the long spring and having a sliding connection with the long spring at this point, whereby the entire device may give when it mets with an obstruction.

The invention also resides in certain details of a construction utilized for clamping and supporting device upon the frame of the machine.

The invention may be further briefly summarized as consisting in the construction and combination of parts hereinafter set forth in the following description, drawings and claims.

Referring to the drawings, Figure 1 is a side elevation of a portion of a machine showing the device applied; Fig. 2 is a front elevation of a pair of wheels and a portion of the forward ends of the side members of the frame showing the device applied; Fig. 3 is a detail view partly in section showing the clamping means; Fig. 4 is a top plan view of the bumper as applied; and Fig. 5 is an enlarged front elevation of the clamp and support with portions broken to show the mode of application.

In carrying out the invention any preferred form and construction of parts may be employed so long as they possess the necessary features, but we have shown one arrangement in the drawings which is effective in operation, and in such embodiment 1 represents the frame of a machine supported on the usual springs 2 resting upon the axle 3 in turn supported upon the wheels 4. The side rails of the frame 1 have the usual forward and downwardly extending front portions secured to the springs, and it is to these downwardly extending portions that the device is applied.

Resting against the curved forward portion of each side rail of the frame 1 is a block 5 of a suitable form and configuration to fit the frame portion and having a curved recess 6 in its upper face. This recess 6 is provided near its bottom with a serrated portion 7 adapted to engage a suitable serrated portion 8 of a clamping member 9 having an angular recess for receiving the corner of one of the supporting springs to be described. Coöperating with this clamping member 9 is another clamping member 10 of similar construction but rounded on the exterior and extending laterally beyond the block 5, as shown in Fig. 5, for the purpose of receiving U-shaped clamping clips 11 which extend down past the lower edge of the frame portion and receive transversely disposed strips 12 each provided with suitable openings for receiving the clips 11. The ends of the clips are threaded and suitable nuts 13 are applied upon these threaded portions, and these nuts clamp against the strips 12 and serve to hold the entire device in place, while the clamping members 9 and 10 serve to clamp the supporting springs.

Secured in each of the supporting clamps and in the angular recesses in the clamping members is a semi-elliptical supporting spring 14 preferably formed of a plurality of leaves, and each of these supporting springs is in length less than one-half of the width of the car with its end toward the side of the car pivotally secured by means of a bolt 15 to a bumper spring 16 extending from one side of the car to the other. This spring 16 is preferably made up of leaves, and near its center the inner leaf is provided with a portion 17 spaced from the remaining leaves to form a recess 18 for a purpose to be described. The several leaves are secured together by means of a rivet or bolt 19, and a spacing washer 20 is provided to maintain the relation between the portion 17 of the rear spring leaf and the remaining leaves. The inner end of each of the supporting springs is provided with a bolt or pin 21 engaging in the corresponding portion of the recess 18 whereby when the bumper spring and the supporting spring are compressed, the inner end of each of the supporting springs will give toward the center and mit the spring action which is common in devices of this sort.

From the foregoing it will be seen that when the bumper strikes an obstruction the bumper spring 16 will give and at the same time the supporting springs will give, the inner end of each supporting spring moving freely toward the center in its recess, so that the entire device is yielding and is not bent by shocks. The extreme flexibility of the device and the extreme yielding effect prevent much of the injury to persons due to being hit by either bumpers of other description or by parts of the machine.

Having described our invention, we claim:—

1. In combination with a motor vehicle frame, of a pair of semi-elliptical supporting springs one secured to each spring knuckle, a main bumper spring having each of its ends secured to one end of the corresponding supporting spring, and suitable sliding connections between the inner ends of said supporting spring and the main bumper spring.

2. In combination with a motor vehicle frame, of suitable clamps secured thereon, semi-elliptical supporting springs mounted in each clamp, a main bumper spring having each of its ends secured to one end of each bumper spring secured to one end of the corresponding supporting spring and having a suitable recess near its center, and a device carried by the inner end of each supporting spring engaging in said recess and providing a sliding joint between the supporting spring and the main bumper spring.

3. In combination with a motor vehicle frame, of a block resting upon the frame and having a recess provided with a serrated portion, a clamping member having a serrated portion engaging the serrated portion of the block, and another clamping member, means for drawing the clamping members together and supporting the entire device upon the frame, a bumper supporting spring mounted in each clamp, a main bumper spring extending across the machine and having each of its ends secured to the corresponding end of one of the supporting springs, and also having a recess near its center, and a pin carried by the inner end of each supporting spring and engaging in said recess..

4. A clamp for bumper springs comprising a block having a curved recess, a serrated portion within said recess, a clamping member having serrations adapted for engagement with said serrated portion, another clamping member coöperating with the first mentioned clamping member and having portions extending laterally beyond the sides of the block, U-shaped supporting clips engaging the lateral extensions of the second mentioned clamping member, suitable strips adapted to extend under the frame and from the arm of one of the U-shaped clips to the corresponding arm of the other, and clamping means provided upon both ends of each of said U-shaped clips.

In testimony whereof we affix our signatures in presence of two witnesses as follows.

ARTHUR B. WEIL.
HERMAN F. STUHR.

Witnesses:
G. O. FARQUHARSON,
C. H. TRESCH.